United States Patent
Sekiguchi et al.

(10) Patent No.: US 7,101,496 B2
(45) Date of Patent: Sep. 5, 2006

(54) THERMOPLASTIC NORBORNENE RESIN BASED OPTICAL FILM

(75) Inventors: Masayuki Sekiguchi, Ichihara (JP); Yasuhiro Sakakura, Ichihara (JP); Hiraku Shibata, Ichihara (JP)

(73) Assignee: JSR Corporation, Tokyo (JP)

( * ) Notice: Subject to any disclaimer, the term of this patent is extended or adjusted under 35 U.S.C. 154(b) by 172 days.

(21) Appl. No.: 10/433,609

(22) PCT Filed: Apr. 30, 2002

(86) PCT No.: PCT/JP02/04335

§ 371 (c)(1), (2), (4) Date: Jun. 17, 2003

(87) PCT Pub. No.: WO02/088783

PCT Pub. Date: Nov. 7, 2002

(65) Prior Publication Data

US 2004/0047056 A1    Mar. 11, 2004

(30) Foreign Application Priority Data

Apr. 27, 2001  (JP) .............................. 2001-133206
Dec. 14, 2001  (JP) .............................. 2001-382070

(51) Int. Cl.
| | |
|---|---|
| B02B 27/00 | (2006.01) |
| C08F 277/00 | (2006.01) |
| F21V 9/14 | (2006.01) |
| F21V 9/00 | (2006.01) |
| G02B 1/04 | (2006.01) |
| G02B 5/30 | (2006.01) |

(52) U.S. Cl. ....................... 252/585; 252/582; 359/580; 428/411.1

(58) Field of Classification Search ................. 252/585
See application file for complete search history.

(56) References Cited

U.S. PATENT DOCUMENTS

| 5,053,471 A | 10/1991 | Goto et al. |
|---|---|---|
| 5,178,955 A * | 1/1993 | Aharoni et al. .............. 428/421 |
| 5,516,456 A * | 5/1996 | Shinohara et al. ...... 252/299.01 |
| 5,611,985 A * | 3/1997 | Kobayashi et al. .......... 264/291 |
| 5,645,766 A * | 7/1997 | Shiro et al. .................. 252/582 |
| 6,063,886 A * | 5/2000 | Yamaguchi et al. ......... 526/282 |
| 6,232,413 B1 * | 5/2001 | Starzewski et al. ......... 526/134 |
| 6,447,868 B1 | 9/2002 | Sekiguchi et al. |
| 6,552,145 B1 | 4/2003 | Okada et al. |
| 2004/0047056 A1 | 3/2004 | Sekiguchi et al. |

FOREIGN PATENT DOCUMENTS

| EP | 0 827 975 | 3/1998 |
|---|---|---|
| JP | 1-132625 | 5/1989 |
| JP | 4-245202 | 9/1992 |
| JP | 09 324036 | 12/1997 |
| JP | 2000-219752 | * 8/2000 |
| WO | WO 98/01483 | * 1/1998 |

OTHER PUBLICATIONS

U.S. Appl. No. 10/433,609, filed Jun. 17, 2003, Sekiguchi et al.
U.S. Appl. No. 10/433,611, filed Jun. 17, 2003, Sekiguchi et al.
U.S. Appl. No. 10/433,609, filed Jun. 17, 2003, Sekiguchi et al.
U.S. Appl. No. 10/491,433, filed Apr. 12, 2004, Sekiguchi et al.
U.S. Appl. No. 10/534,003, filed May 5, 2005, Miyaki et al.

* cited by examiner

*Primary Examiner*—Randy Gulakowski
*Assistant Examiner*—Timothy J. Kugel
(74) *Attorney, Agent, or Firm*—Oblon, Spivak, McClelland, Maier & Neustadt, P.C.

(57) ABSTRACT

A thermoplastic norbornene resin which displays a high degree of toughness, and for which the exhibited retardation and the wavelength dependency of that retardation can be controlled is provided, which is formed from a copolymer with a structural unit represented by a general formula (1) and a structural unit represented by a general formula (2).

15 Claims, 2 Drawing Sheets

THERMOPLASTIC NORBORNENE RESIN BASED OPTICAL FILM

TECHNICAL FIELD

The present invention relates to an optical film comprising a thermoplastic norbornene resin as a primary constituent. The film displays a high degree of toughness, has excellent adhesion and bonding to other materials, is highly transparent, and has good retardation uniformity within the film, and moreover these retardation characteristics are largely unaffected by environmental temperature and humidity and display excellent stability over time. In addition, the present invention also relates to optical films with functions of retardation, light diffusion, transparent conductivity and reflection prevention.

BACKGROUND ART

Cyclic polyolefin based resins have properties which include a high glass transition temperature due to the rigidity of the primary chain structure, a non-crystalline structure with a high light transmittance due to the presence of bulky groups on the primary chain structure, and a low birefringence due to the small anisotropy of the refractive index, and are consequently drawing considerable attention as transparent thermoplastic resins with superior heat resistance, transparency and optical characteristics.

Examples of this type of cyclic polyolefin based resin are disclosed in Japanese Laid-open publication (kokai) No. 1-132625 (JP1-132625A), Japanese Laid-open publication (kokai) No. 1-132626 (JP1-32626A), Japanese Laid-open publication (kokai) No. 63-218726 (JP63-218726A), Japanese Laid-open publication (kokai) No. 2-133413 (JP2-133413A), Japanese Laid-open publication (kokai) No. 61-120816 (JP61-120816A), and Japanese Laid-open publication (kokai) No. 61-115912 (JP61-115912A).

In recent years, the utilization of the above properties in the application of cyclic polyolefin based resins to optical materials such as optical disks, optical lenses and optical fibers and the like, as well as to fields such as sealing materials for optical semiconductor sealing has been the subject of much investigation.

In terms of the application of cyclic polyolefin based films to optical films, investigations have also been conducted with the aim of improving problems associated with conventional optical films, as described below.

Films of polycarbonate, polyester and triacetylacetate, which have been widely used as optical films, suffer from several problems including a large photoelasticity coefficient which can cause retardation and variations to appear with only minor variations in stress, inferior heat resistance, and deformation on moisture absorption, and consequently the application of films formed from cyclic polyolefin based resins to a variety of different film applications have been reported. Specific examples include the retardation plates formed from cyclic polyolefin based resin films disclosed in Japanese Laid-open publication (kokai) No. 4-245202 (JP4-245202A), Japanese Laid-open publication (kokai) No. 4-36120 (JP4-36120A), Japanese Laid-open publication (kokai) No. 5-2108 (JP5-2108A) and Japanese Laid-open publication (kokai) No. 5-64865 (JP5-64865A). The application of cyclic polyolefin based resin films to protective films for polarizing plates is disclosed in Japanese Laid-open publication (kokai) No. 5-212828 (JP5-212828A), Japanese Laid-open publication (kokai) No. 6-51117 (JP6-51117A) and Japanese Laid-open publication (kokai) No. 7-77608 (JP7-77608A). Moreover, a liquid crystal display element substrate formed from a cyclic polyolefin based resin film is disclosed in Japanese Laid-open publication (kokai) No. 5-61026 (JP5-61026A).

In the applications described above, a cyclic polyolefin based resin is reported that has a water absorption of no more than 0.05% and which can be produced with relative ease. Such low water absorption values are reported as the special characteristics of the resins, and are described as essential properties. However, if this type of low water absorption cyclic polyolefin based resin film is used as a retardation plate or a liquid crystal display element substrate, then the film may suffer from inferior adhesion to a hard coat, an antireflective film or a transparent conductive layer, or inferior bonding with the polarizing plate and the glass. In cases in which a cyclic polyolefin based resin film is used as a protective film for a polarizing plate, then in addition to the adhesion problems outlined above, an additional problem arises in that the water of the water based adhesive typically used for bonding the film to the polarizer is very difficult to dry.

However, the cyclic polyolefin based resin family includes a wide range of different structures, and not all cyclic polyolefin based resins display a water absorption of 0.05% or less. In order to ensure a water absorption of no more than 0.05%, the cyclic polyolefin based resin must have either a polyolefin structure formed from only carbon atoms and hydrogen atoms, or a structure which incorporates a proportion of halogen atoms.

Consequently, in order to resolve the aforementioned problems relating to low water absorption, optical films incorporating a thermoplastic norbornene resin with a polar group incorporated within the molecular structure have been disclosed in Japanese Laid-open publication (kokai) No. 7-287122 (JP7-287122A) and Japanese Laid-open publication (kokai) No. 7-287123 (1P7-287123A). The optical films disclosed in these applications display superior optical characteristics including a high degree of transparency, a low retardation of transmitted light, and a uniform and stable application of retardation to transmitted light upon stretching and orientation. The optical films offer good levels of heat resistance and adhesion and bonding with other materials, and moreover also undergo little deformation on water absorption, but because the toughness of these films is poor, handling problems arise in the processing and use of these films.

DISCLOSURE OF INVENTION

An object of the present invention is to provide an optical film which displays superior toughness and good handling properties during processing and use, and yet still retains the superior optical characteristics of an optical film comprising a conventional cyclic polyolefin based resin or a thermoplastic norbornene based resin as a primary constituent, namely, superior heat resistance together with good adhesion and bonding to other materials.

In order to achieve the above object, a first aspect of the present invention provides an optical film comprising at least one resin-layer comprising a thermoplastic norbornene resin formed of a copolymer comprising:

a structural unit a represented by a general formula (1) shown below:

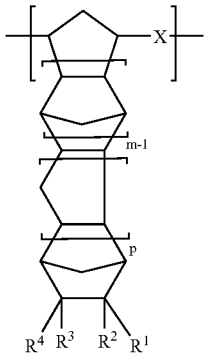

(1)

wherein, m is an integer of at least 1, p represents either one of 0 and an integer of at least 1, X represents either one of a group represented by a formula —CH═CH— and a group represented by a formula —CH$_2$CH$_2$—, R$^1$ to R$^4$ each represent, independently, any one of a hydrogen atom, a halogen atom, a substituted or unsubstituted hydrocarbon group of 1 to 30 carbon atoms which may contain a linkage group incorporating any one of an oxygen atom, a nitrogen atom, a sulfur atom and a silicon atom, and a polar group, provided that said groups R$^1$ to R$^4$ each exclude a group represented by a general formula (a) shown below:

—(CH$_2$)$_q$—O—C(O)—R'  (a)

where q represents either one of 0 and an integer of at least 1, and R' represents an organic group; and a structural unit b represented by a general formula (2) shown below:

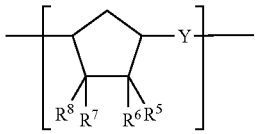

(2)

wherein,

Y represents either one of a group represented by a formula —CH═CH— and a group represented by a formula —CH$_2$CH$_2$—, R$^5$ to R$^8$ each represent, independently, any one of a hydrogen atom, a halogen atom, a substituted or unsubstituted hydrocarbon group of 1 to 30 carbon atoms which may contain a linkage group incorporating any one of an oxygen atom, a nitrogen atom, a sulfur atom and a silicon atom, and a polar group, provided that said groups R$^5$ to R$^8$ each exclude a group represented by a general formula (a) shown below:

—(CH$_2$)$_q$—O—C(O)—R'  (a)

where q represents either one of 0 and an integer of at least 1, and R' represents an organic group, a plurality of X's present in a molecule of said copolymer being the same or different, and a plurality of Y's present in a molecule of said copolymer being the same or different.

In addition, the present invention also provides a production method for the aforementioned optical film comprising a step for casting an organic solvent solution containing the thermoplastic norbornene resin stated above.

In addition, the present invention also provides as an embodiment of the optical film stated above an optical film wherein a solvent content in the or each resin-layer is no more than 10% by weight, including an optical film produced by the aforementioned production method.

In addition, the present invention also provides as another embodiment of the present invention an optical film which imparts retardation to transmitted light.

In addition, the present invention also provides an aforementioned optical film with a light diffusing function on at least one surface thereof.

In addition, the present invention also provides an aforementioned optical film with a transparent conductive layer on at least one surface thereof.

In addition, the present invention also provides an aforementioned optical film with an antireflective layer on at least one surface thereof.

In addition, the present invention also provides a polarizing plate comprising an aforementioned optical film. Specifically, as embodiments a polarizing plate comprising the optical film as protective film formed on at least one surface of the substrate, or as the substrate.

BEST MODE FOR CARRYING OUT THE INVENTION

Figure 1:
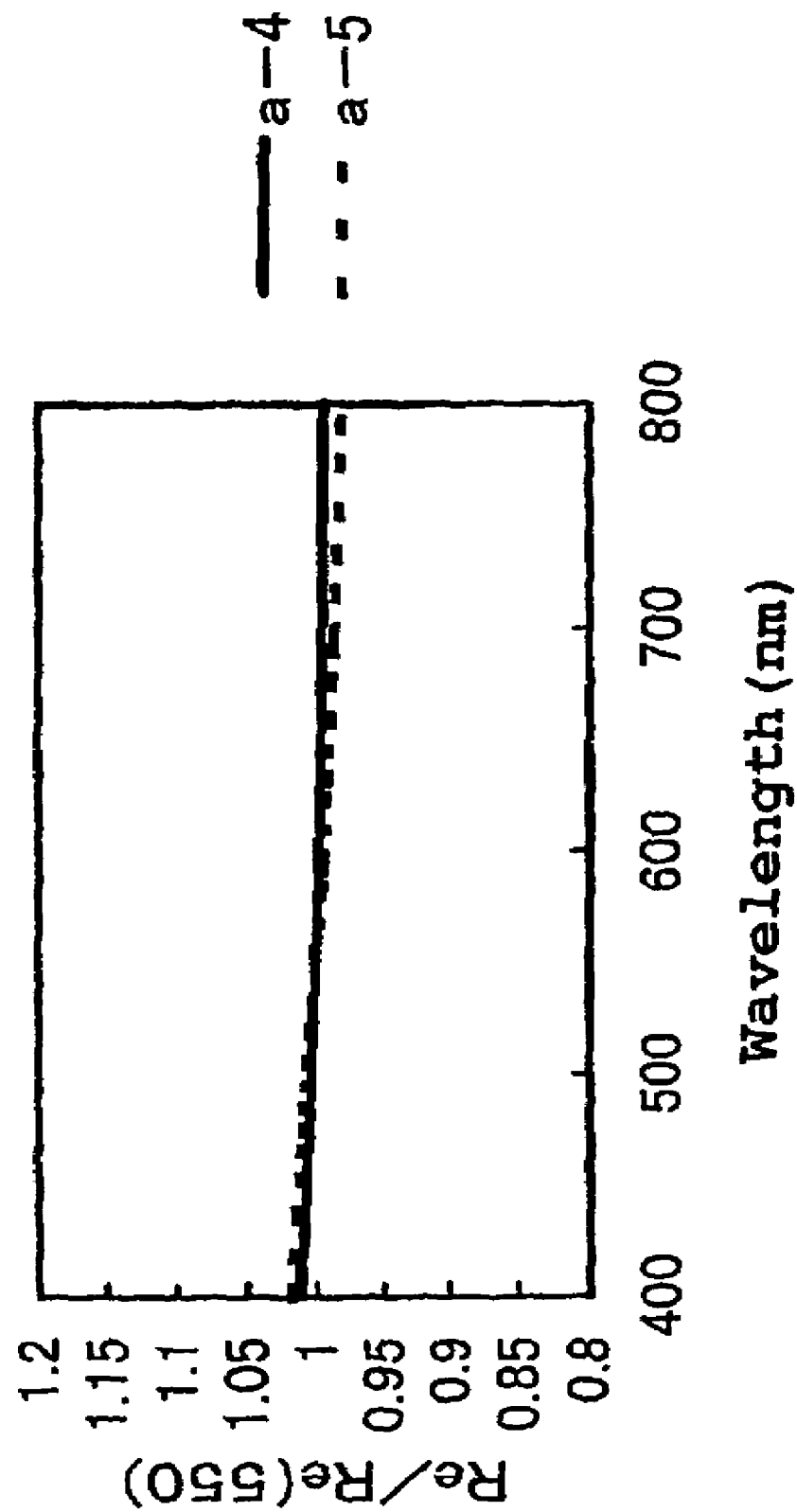
FIG. 1 is a graph showing the results of measuring the relationship Re/Re (550) of the retardation value Re of transmitted light within a wavelength range from 400 to 800 nm, referenced against the retardation value Re (550) of transmitted light at wavelength 550 nm, for retardation films (a-4) and (a-5) produced in an example 1.

The following is a more detailed description of the present invention. The term "retardation" herein means the retardation of an optical phase of a light that occurs when the light is transmitted through an object. This terminology is found in many literature publications, for example, IDW (International Display Workshop) '00, pages 407–418.

—First Aspect of the Invention—

[Optical Film]

<Thermoplastic Norbornene Resin>

A copolymer used for an optical film of the present invention, namely, a thermoplastic norbornene resin (hereafter this resin may be described as a "norbornene resin") incorporates a structural unit a represented by the aforementioned general formula (1) and a structural unit b represented by the aforementioned general formula (2) as essential structural units, although the resin may also optionally incorporate other structural units as required.

The copolymer is produced by the copolymerization of a monomer mixture comprising at least one monomer A represented by a general formula (3) shown below, and at least one monomer B represented by a general formula (4) shown below.

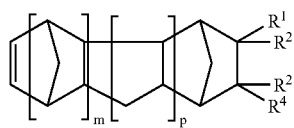

(3)

[wherein, m, p, $R^1$, $R^2$, $R^3$ and $R^4$ represent the same meanings defined above in relation to the general formula (1)]

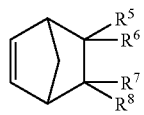

(4)

[wherein, $R^5$, $R^6$, $R^7$ and $R^8$ represent the same meanings defined above in relation to the general formula (2)]

In the general formulas (1) through (4), the groups $R^1$ through $R^8$ represent a hydrogen atom; a halogen atom; a substituted or unsubstituted hydrocarbon group of 1 to 30 carbon atoms which may contain a linkage group incorporating an oxygen atom, a nitrogen atom, a sulfur atom or a silicon atom; or a polar group. The following is a more detailed description of the aforementioned atoms and groups.

Examples of suitable halogen atoms include fluorine atoms, chlorine atoms and bromine atoms.

Examples of suitable hydrocarbon groups of 1 to 30 carbon atoms include alkyl groups such as methyl groups, ethyl groups and propyl groups; cycloalkyl groups such as cyclopentyl groups and cyclohexyl groups; and alkenyl groups such as vinyl groups, allyl groups and propenyl groups.

The aforementioned substituted or unsubstituted hydrocarbon groups may be either bonded directly to the cyclic structure, or bonded via a linkage group. Examples of suitable linkage groups include bivalent hydrocarbon groups of 1 to 10 carbon atoms (such as alkylene groups represented by —(CH$_2$)$_m$— (wherein m is an integer of 1 to 10)); and linkage groups incorporating an oxygen atom, a nitrogen atom, a sulfur atom or a silicon atom (such as carbonyl groups (—CO—), oxycarbonyl groups (—O(CO)—), sulfonyl groups (—SO$_2$—), ether linkages (—O—), thioether linkages (—S—), imino groups (—NH—), amide linkages (—NHCO—, —CONH—), and siloxane linkages (—OSi(R$_2$)— (wherein R represents an alkyl group such as a methyl group or an ethyl group), and linkage groups incorporating a plurality of these linkages are also possible.

Examples of suitable polar groups include hydroxy groups, and alkoxy groups, alkoxycarbonyl groups, aryloxycarbonyl groups, cyano groups, amide groups, imide ring containing groups, triorganosiloxy groups, triorganosilyl groups, amino groups, acyl groups, alkoxysilyl groups, sulfonyl containing groups and carboxyl groups of 1 to 10 carbon atoms. Specific examples include alkoxy groups such as methoxy groups and ethoxy groups; alkoxycarbonyl groups such as methoxycarbonyl groups and ethoxycarbonyl groups; aryloxycarbonyl groups such as phenoxycarbonyl groups, naphthyloxycarbonyl groups, fluorenyloxycarbonyl groups and biphenylyloxycarbonyl groups; triorganosiloxy groups such as trimethylsiloxy groups and triethylsiloxy groups; triorganosilyl groups such as trimethylsilyl groups and triethylsilyl groups; amino groups such as primary amino groups; and alkoxysilyl groups such as trimethoxysilyl groups and triethoxysilyl groups.

More specific examples of thermoplastic norbornene resins of the present invention include the copolymers (1) to (3) shown below.

(1) Ring opening copolymers of the monomer A and the monomer B
(2) Ring opening copolymers of the monomer A, the monomer B, and another copolymerizable monomer
(3) Hydrogenated products of the ring opening copolymers of (1) or (2) above The monomer A and the monomer B will be described in further detail below, but they are not restricted to the examples presented.

<Monomer A>

The structural unit a is derived from the monomer A. Specific examples of the monomer A are shown below, although the present invention is not restricted to the examples presented. The monomer A may also comprise a combination of two or more different monomers. Specific examples include tricyclo[5.2.1.0$^{2,6}$]-8-decene,
tetracyclo[4.4.0.1$^{2,5}$.1$^{7,10}$]-3-dodecene,
pentacyclo[6.5.1.1$^{3,6}$.0$^{2,7}$.0$^{9,13}$]-4-pentadecene,
pentacyclo[7.4.0.1$^{2,5}$.1$^{9,12}$.0$^{8,13}$]3-pentadecene,
tricyclo[4.4.0.1$^{2,5}$]-3-undecene,
8-methoxycarbonyltetracyclo[4.4.0.1$^{2,5}$.1$^{7,10}$]-3-dodecene,
8-ethoxycarbonyltetracyclo[4.4.0.1$^{2,5}$.1$^{7,10}$]-3-dodecene,
8-n-propoxycarbonyltetracyclo[4.4.0.1$^{2,5}$.1$^{7,10}$]-3-dodecene,
8-isopropoxycarbonyltetracyclo[4.4.0.1$^{2,5}$.1$^{7,10}$]-3dodecene,
8-n-butoxycarbonyltetracyclo[4.4.0.1$^{2,5}$.1$^{7,10}$]-3-dodecene,
8-phenoxycarbonyltetracyclo[4.4.0.1$^{2,5}$.1$^{7,10}$]-3-dodecene,
8-methyl-8-methoxycarbonyltetracyclo[4.4.0.1$^{2,5}$.1$^{7,10}$]-3-dodecene,
8-methyl-8-ethoxycarbonyltetracyclo[4.4.0.1$^{2,5}$.1$^{7,10}$]-3-dodecene,
8-methyl-8-n-propoxycarbonyltetracyclo[4.4.0.1$^{2,5}$.1$^{7,10}$]-3-dodecene,
8-methyl-8-isopropoxycarbonyltetracyclo[4.4.0.1$^{2,5}$.1$^{7,10}$]-3-dodecene,
8-methyl-8-n-butoxycarbonyltetracyclo[4.4.0.1$^{2,5}$.1$^{7,10}$]-3-dodecene,
8-methyl-8-phenoxycarbonyltetracyclo[4.4.0.1$^{2,5}$.1$^{7,10}$]-3-dodecene,
pentacyclo[8.4.0.1$^{2,5}$.1$^{9,2}$.0$^{8,13}$]-3-hexadecene,
heptacyclo[8.7.0.1$^{3,6}$.1$^{10,17}$.1$^{12,15}$.0$^{2,7}$.0$^{11,16}$]-4-eicosene,
heptacyclo[8.8.0.1$^{4,7}$.1$^{11,18}$.1$^{13,16}$.0$^{3,8}$.0$^{12,17}$]-5-heneicosene,
8-ethylidenetetracyclo[4.4.0.1$^{2,5}$.1$^{7,10}$]-3-dodecene, 8-phenyltetracyclo[4.4.0.1$^{2,5}$.1$^{7,10}$]-3-dodecene,
8-methyl-8-phenyltetracyclo[4.4.0.1$^{2,5}$.1$^{7,10}$]-3-dodecene,
8-fluorotetracyclo[4.4.0.1$^{2,5}$.1$^{7,10}$]-3-dodecene,
8-fluoromethyltetracyclo[4.4.0.1$^{2,5}$.1$^{7,10}$]-3-dodecene,
8-difluoromethyltetracyclo[4.4.0.1$^{2,5}$.1$^{7,10}$]-3-dodecene,
8-trifluoromethyltetracyclo[4.4.0.1$^{2,5}$.1$^{7,10}$]-3-dodecene,
8-pentafluoroethyltetracyclo[4.4.0.1$^{2,5}$.1$^{7,10}$]-3-dodecene,
8,8-difluorotetracyclo[4.4.0.1$^{2,5}$.1$^{7,10}$]-3-dodecene,
8,9-difluorotetracyclo[4.4.0.1$^{2,5}$.1$^{7,10}$]-3-dodecene,
8,8-bis(trifluoromethyl)tetracyclo[4.4.0.1$^{2,5}$.1$^{7,10}$]-3-dodecene,
8,9-bis(trifluoromethyl)tetracyclo[4.4.0.1$^{2,5}$.1$^{7,10}$]-3-dodecene,
8-methyl-8-trifluoromethyltetracyclo[4.4.0.1$^{2,5}$.1$^{7,10}$]-3-dodecene,
8,8,9-trifluorotetracyclo[4.4.0.1$^{2.5}$.1$^{7,10}$]-3-dodecene,
8,8,9-tris(trifluoromethyl)tetracyclo[4.4.0.1$^{2,5}$.1$^{7,10}$]-3-dodecene,
8,8,9,9-tetrafluorotetracyclo[4.4.0.1$^{2.5}$.1$^{7,10}$]-3-dodecene,
8,8,9,9-tetrakis(trifluoromethyl)tetracyclo[4.4.0.1$^{2,5}$.1$^{7,10}$]-3-dodecene,
8,8-difluoro-9,9-bis(trifluoromethyl)tetracyclo[4.4.0.1$^{2,5}$.1$^{7,10}$]-3-dodecene,
8,9-difluoro-8,9-bis(trifluoromethyl)tetracyclo[4.4.0.1$^{2,5}$.1$^{7,10}$]-3-dodecene,
8,8,9-trifluoro-9-trifluoromethyltetracyclo[4.4.0.1$^{2,5}$.1$^{7,10}$]-3-dodecene,
8,8,9-trifluoro-9-trifluoromethoxytetracyclo[4.4.0.1$^{2,5}$.1$^{7,10}$]-3-dodecene,
8,8,9-trifluoro-9-pentafluoropropoxytetracyclo[4.4.0.1$^{2,5}$.1$^{7,10}$]-3-dodecene,
8-fluoro-8-pentafluoroethyl-9,9-bis(trifluoromethyl)tetracyclo[4.4.0.1$^{2,5}$.1$^{7,10}$]-3-dodecene,
8,9-difluoro-8-heptafluoroiso-propyl-9-trifluoromethyltetracyclo[4.4.0.1$^{2,5}$.1$^{7,10}$]-3-dodecene,
8-chloro-8,9,9-trifluorotetracyclo[4.4.0.1$^{2,5}$.1$^{7,10}$]-3-dodecene,
8,9-dichloro-8,9-bis(trifluoromethyl)tetracyclo[4.4.0.1$^{2,5}$.1$^{7,10}$]-3-dodecene,
8-(2,2,2-trifluoroethoxycarbonyl)tetracyclo[4.4.0.1$^{2,5}$.1$^{7,10}$]-3-dodecene, and
8-methyl-8-(2,2,2-trifluoroethoxycarbonyl)tetracyclo[4.4.0.1$^{2,5}$.1$^{7,10}$]-3-dodecene.

Of these compounds, monomers A with at least one polar group within the molecule are preferred. In other words, compounds of the aforementioned general formula (3) in which $R^1$ and $R^3$ are hydrogen atoms or hydrocarbon groups of 1 to 10 carbon atoms, $R^2$ and $R^4$ are hydrogen atoms or monovalent organic groups, and at least one of $R^2$ and $R^4$ is a polar group other than a hydrogen atom or a hydrocarbon group, display the greatest improvement in adhesion and bonding with other materials, and are consequently preferred.

The amount of the polar group incorporated within the copolymer can be determined in accordance with the functions required, and there are no particular restrictions on the polar group content, although the number of the structural units a with a polar group should typically be at least 1 mol %, and preferably at least 5 mol %, and even more preferably at least 10 mol %, of the total number of the structural units a. Compounds in which all of the structural units a comprise a polar group are also suitable.

In addition, monomers A in which at least one of $R^2$ and $R^4$ is a polar group represented by a general formula (5), shown below, $$—(CH_2)_nCOOR^9 \qquad (5)$$

(wherein, n is typically an integer of 0 to 5, preferably an integer of 0 to 2, and even more preferably represents 0, and $R^9$ is a monovalent organic group)

give rise to product copolymers for which the glass transition temperature and the water absorption can be controlled with relative ease, and are consequently preferred. In the general formula (5), examples of the monovalent organic group represented by $R^9$ include alkyl groups such as methyl groups, ethyl groups and propyl groups; aryl groups such as phenyl groups, naphthyl groups, anthracenyl groups and biphenylyl groups; as well as other monovalent groups with an aromatic ring or an heterocyclic ring such as a furan ring or an imide ring such as diphenylsulfone and tetrahydrofluorene.

In the general formula (5), n is typically an integer of 0 to 5, as described above, although smaller values of n give rise to product copolymers with higher glass transition temperatures, and are consequently preferred, and monomers A in which n is 0 are particularly preferred as the synthesis of such monomers is relatively simple.

In the aforementioned general formula (3), if a further alkyl group is bonded to the carbon atom to which the polar group represented by the general formula (5) is bonded, then the product copolymer provides a good balance between heat resistance and water absorption, and consequently such monomers are preferred. The number of carbon atoms within this alkyl group is preferably from 1 to 5, and more preferably from 1 to 2, with alkyl groups of 1 carbon atom being particularly desirable.

In the general formula (3), monomers A in which the value of m is 1 and the value of p is 0 enable the production of copolymers with a high glass transition temperature, and are consequently preferred.

From amongst the specific examples of the monomer A presented above, 8-methyl-8-methoxycarbonyltetracyclo[4.4.0.1$^{2,5}$.1$^{7,10}$]-3-dodecene is preferred as it enables the production of a copolymer with a high glass transition temperature, and furthermore a film produced from the copolymer is able to maintain a level of water absorption which produces good adhesion and bonding to other materials, without suffering any deleterious deformation or the like upon water absorption.

<Monomer B>

The structural unit b is derived from the monomer B. Specific examples of the monomer B are shown below, although the present invention is not restricted to the examples presented. The monomer B may also comprise a combination of two or more different monomers. Specific examples include
bicyclo[2.2.1]hept-2-ene,
5-methylbicyclo[2.2.1]hept-2-ene,
5-ethylbicyclo[2.2.1]hept-2-ene,
5-methoxycarbonylbicyclo[2.2.1]hept-2-ene,
5-methyl-5-methoxycarbonylbicyclo[2.2.1]hept-2-ene,
5-phenoxycarbonylbicyclo[2.2.1]hept-2-ene,
5-methyl-5-phenoxycarbonylbicyclo[2.2.1]hept-2-ene,
5-cyanobicyclo[2.2.1]hept-2-ene,
5-ethylidenebicyclo[2.2.1]hept-2-ene,
5-phenylbicyclo[2.2.1]hept-2-ene, 5-(2-naphthyl)bicyclo[2.2.1]hept-2-ene (both α and β types are possible),
5-fluorobicyclo[2.2.1]hept-2-ene,
5-fluoromethylbicyclo[2.2.1]hept-2-ene,
5-trifluoromethylbicyclo[2.2.1]hept-2-ene,
5-pentafluoroethylbicyclo[2.2.1]hept-2-ene,
5,5-difluorobicyclo[2.2.1]hept-2-ene,
5,6-difluorobicyclo[2.2.1]hept-2-ene,
5,5-bis(trifluoromethyl)bicyclo[2.2.1]hept-2-ene,
5,6-bis(trifluoromethyl)bicyclo[2.2.1]hept-2-ene,
5-methyl-5-trifluoromethylbicyclo[2.2.1]hept-2-ene,
5,5,6-trifluorobicyclo[2.2.1]hept-2-ene,
5,5,6-tris(trifluoromethyl)bicyclo[2.2.1]hept-2-ene,
5,6,6-tetrafluorobicyclo[2.2.1]hept-2-ene,
5,5,6,6-tetrakis(trifluoromethyl)bicyclo[2.2.1]hept-2-ene,
5,5-difluoro-6,6-bis(trifluoromethyl)bicyclo[2.2.1]hept-2-ene,
5,6-difluoro-5,6-bis(trifluoromethyl)bicyclo[2.2.1]hept-2-ene,
5,5,6-trifluoro-6-trifluoromethylbicyclo[2.2.1]hept-2-ene,
5-fluoro-5-pentafluoroethyl-6,6-bis(trifluoromethyl)bicyclo[2.2.1]hept-2-ene,
5,6-difluoro-5-heptafluoro-iso-propyl-6-trifluoromethyl-bicyclo[2.2.1]hept-2-ene,
5-chloro-5,6,6-trifluorobicyclo[2.2.1]hept-2-ene,
5,6-dichloro-5,6-bis(trifluoromethyl)bicyclo[2.2.1]hept-2-ene,
5,5,6-trifluoro-6-trifluoromethoxybicyclo[2.2.1]hept-2-ene,
5,5,6-trifluoro-6-heptafluoropropoxybicyclo[2.2.1]hept-2-ene,
5-(4-phenylphenyl)bicyclo[2.2.1]hept-2-ene, and
4-(bicyclo[2.2.1]hept-5-en-2-yl)phenylsulfonylbenzene.

Of these compounds, those monomers B in which all of the $R^5$ to $R^8$ groups of the general formula (4) are hydrogen atoms, or in which any one of the groups is a hydrocarbon group of 1 to 30 carbon atoms and the reaming groups are hydrogen atoms, enable the production of an optical film with a large improvement in toughness, and are consequently preferred. From the viewpoint of heat resistance, those monomers B in which all of the $R^5$ to $R^8$ groups of the general formula (4) are hydrogen atoms, or in which any one of the groups is a methyl group, an ethyl group or a phenyl group and the remaining groups are hydrogen atoms, are particularly preferred. In terms of relative ease of synthesis, bicyclo[2.2.1]hept-2-ene and 5-phenylbicyclo[2.2.1]hept-2-ene are preferred.

<Other Copolymerizable Monomers>

Examples of other copolymerizable monomers which can be copolymerized with the monomer A and the monomer B include cycloolefins such as cyclobutene, cyclopentene, cycloheptene, cyclooctene, tricyclo[5.2.1.0$^{2,6}$]-3-decene and dicyclopentadiene. The number of carbon atoms within these cycloolefins should preferably be from 4 to 20 atoms, with numbers from 5 to 12 atoms being even more desirable.

The monomer A and the monomer B may also be polymerized in the presence of an unsaturated hydrocarbon polymer with an olefin based unsaturated bond within the primary chain such as polybutadiene, polyisoprene, styrene-butadiene copolymers, ethylene nonconjugated diene copolymers and polynorbornene. In such cases, the product copolymer is useful as a raw material for high impact resistant resins.

<Polymerization Conditions>

As follows is a description of the conditions for the ring opening copolymerization reaction between the monomer A, the monomer B, and where used, another monomer.

•Ring Opening Copolymerization Catalyst

The ring opening copolymerization reaction is conducted in the presence of a metathesis catalyst.

This metathesis catalyst is a combination of (a) at least one compound selected from a group consisting of W, Mo and Re compounds, and (b) at least one compound selected from compounds of a group IA element (such as Li, Na or K), a group IIA element (such as Mg or Ca), a group IIB element (such as Zn, Cd or Hg), a group IIIB element (such as B or Al), a group IVA element (such as Ti or Zr) or a group IVB element (such as Si, Sn or Pb) of the Deming periodic table, which contain at least one bond between the aforementioned element and carbon, or between the aforementioned element and hydrogen. In order to raise the activity of the catalyst, an additive (c) described below may also be added.

Representative examples of the W, Mo or Re compound of the aforementioned constituent (a) include those compounds disclosed in Japanese Laid-open publication (kokai) No. 1-240517 (JP1-240517A) such as $WCl_6$, $MoCl_5$ and $ReOCl_3$.

Specific examples of the aforementioned constituent (b) include those compounds disclosed in Japanese Laid-open publication (kokai) No. 1-240517 (JP1-240517A) such as n-$C_4H_9$Li, $(C_2H_5)_3$Al, $(C_2H_5)_2$AlCl, $(C_2H_5)_{1.5}$AlCl$_{1.5}$, $(C_2H_5)$AlCl$_2$, methyl alumoxane and LiH.

Representative examples of the aforementioned constituent (c) include alcohols, aldehydes, ketones and amines, as well as those compounds disclosed in Japanese Laid-open publication (kokai) No. 1-240517 (JP 1-240517A).

The amount of the metathesis catalyst used should typically result in a molar ratio between the aforementioned constituent (a) and the monomer A and the monomer B (hereafter the combination of the two monomers is referred to as "specified monomers"), namely the ratio of constituent (a):specified monomers, within a range from 1:500 to 1:50,000, and preferably within a range from 1:1000 to 1:10,000.

The relative proportions of the constituent (a) and the constituent (b) should produce a metal atom ratio (a):(b) within a range from 1:1 to 1:50, and preferably from 1:2 to 1:30.

The relative proportions of the constituent (a) and the constituent (c) should produce a molar ratio (c):(a) within a range from 0.005:1 to 15:1, and preferably from 0.05:1 to 7:1.

•Molecular Weight Regulating Agent

Regulation of the molecular weight of the copolymer can also be achieved through controlling the polymerization temperature, the type of catalyst and the type of solvent, although in the present invention the molecular weight should preferably be regulated by adding a molecular weight regulating agent to the reaction system.

Examples of suitable molecular weight regulating agents include α-olefins such as ethylene, propene, 1-butene, 1-pentene, 1-hexene, 1-heptene, 1-octene, 1-nonene and 1-decene, as well as styrene, and of these, 1-butene and 1-hexene are preferred.

This molecular weight regulating agent may utilize a single compound, or a combination of two or more different regulating agents.

The amount of the molecular weight regulating agent used should be from 0.005 to 0.6 mols per 1 mol of the specified monomers supplied to the copolymerization reaction, with quantities from 0.02 to 0.5 mols being preferred.

• Ring Opening Copolymerization Reaction Solvent

Examples of suitable solvents for use in the ring opening copolymerization reaction include alkanes such as pentane, hexane, heptane, octane, nonane and decane; cycloalkanes such as cyclohexane, cycloheptane, cyclooctane, decalin and norbornane; aromatic hydrocarbons such as benzene, toluene, xylene, ethylbenzene and cumene; halogenated hydrocarbon compounds such as chlorobutane, bromohexane, methylene chloride, dichloroethane, hexamethylene dibromide, chlorobenzene, chloroform and tetrachloroethylene; saturated carboxylic acid esters such as ethyl acetate, n-butyl acetate, iso-butyl acetate and methyl propionate; and ethers such as dimethoxyethane, dibutyl ether and tetrahydrofuran, and these solvents may be used singularly, or in combinations of two or more solvents. Of the above solvents, the aforementioned aromatic hydrocarbons are preferred.

The amount of solvent used should typically result in a solvent:specified monomers ratio (weight ratio) from 1:1 to 10:1, with ratios from 1:1 to 5:1 being preferred.

• Hydrogenation of the Copolymer

A copolymer produced in the manner described above may be used, as is, as a resin of the present invention, although any residual olefin based unsaturated bonds should preferably be hydrogenated prior to use.

The hydrogenation reaction can be performed by normal methods, namely, addition of a hydrogenation catalyst to the copolymer solution, and subsequent reaction with hydrogen gas at a pressure of 1 to 300 atmospheres, and preferably 3 to 200 atmospheres, and at a temperature of 0 to 200° C., and preferably 20 to 180° C.

Examples of the hydrogenation catalyst include those catalysts typically used in hydrogenation reactions of olefin based compounds. These hydrogenation catalysts include both heterogeneous catalysts and homogeneous catalysts. In the case of the hydrogenation of a copolymer containing a substituent group with an aromatic ring within the molecule, the conditions should be selected so that the unsaturated bonds of the aromatic ring undergo no significant hydrogenation.

Examples of suitable heterogeneous catalysts include solid catalysts comprising a noble metal such as palladium, platinum, nickel, rhodium or ruthenium supported by a carrier such as carbon, silica, alumina or titania. Examples of suitable homogeneous catalysts include nickel naphthenate/triethyl aluminum, nickel acetylacetonate/triethyl aluminum, cobalt octenate/n-butyl lithium, titanocene dichloride/diethyl aluminum monochloride, rhodium acetate, chlorotris(triphenylphosphine)rhodium, dichlorotris(triphenylphosphine)ruthenium, chlorohydrocarbonyltris(triphenylphosphine)ruthenium, and dichlorocarbonyltris(triphenylphosphine)ruthenium. The catalysts may be in powdered or granulated form.

The hydrogenation catalyst is used in quantities which produce a copolymer:hydrogenation catalyst ratio (weight ratio) within a range from $1:1\times10^{-6}$ to 1:2.

The hydrogenated copolymer produced by the hydrogenation reaction displays excellent thermal stability, and the characteristics of the copolymer are unlikely to deteriorate on heating during the film production method, during stretching and orientation, or during use as a finished product. The hydrogenation ratio of the olefin based unsaturated bonds is typically greater than 50%, preferably at least 70%, even more preferably at least 90%, and most preferably at least 98%.

<Characteristics of Thermoplastic Norbornene Resin>

In the present invention, the weight ratio between the structural unit a and the structural unit b (a/b) is typically from a/b=95/5 to 5/95, with preferred ratios being from 95/5 to 60/40. If the proportion of the structural unit a exceeds the above range, then the anticipated improvements in toughness may not eventuate, whereas if the proportion of the structural unit a is less than the above range, then the glass transition temperature falls, and problems with the heat resistance of the product may arise.

The intrinsic viscosity ($\eta_{inh}$) of a thermoplastic norbornene resin of the present invention measured in chloroform at 30° C. should preferably be from 0.2 to 5 dl/g. Values from 0.3 to 4 dl/g are even more preferable, and values from 0.5 to 3 dl/g are the most desirable. At intrinsic viscosity values exceeding 5 dl/g the viscosity of the solution becomes overly large, and the workability deteriorates, whereas at values less than 0.2 dl/g, the film strength deteriorates.

The molecular weight of a thermoplastic norbornene resin of the present invention, measured as a polystyrene equivalent number average molecular weight (Mn) using gel permeation chromatography (GPC) is typically from 8000 to 1,000,000, preferably from 10,000 to 500,000, even more preferably from 20,000 to 100,000, and most preferably from 30,000 to 100,000. The weight average molecular weight (Mw) is typically within a range from 20,000 to 3,000,000, preferably from 30,000 to 1,000,000, even more preferably from 40,000 to 500,000, and most desirably from 40,000 to 300,000.

The molecular weight distribution of a thermoplastic norbornene resin of the present invention should typically produce a Mw/Mn ratio of 1.5 to 10, with ratios from 2 to 8 being preferred, ratios from 2.5 to 5 being even more preferred, and ratios from 2.5 to 4.5 being the most desirable.

In a thermoplastic norbornene resin of the present invention, the ratio of structures derived from the monomer A and the ratio of structures derived from the monomer B (composition ratio) should preferably produce as little variation as possible within the molecular weight distribution range. Specifically, by ensuring that the composition ratio of a resin of arbitrary molecular weight typically falls within a variation range of ±50%, and preferably within ±30%, and even more preferably within ±20% of the ratios of the monomer A and the monomer B relative to the total amount of monomers supplied to the copolymerization, a more uniform optical film can be obtained. Suppressing the composition variation to the aforementioned range enables a greater uniformity to be achieved in the retardation during stretching and orientation.

The saturated water absorption at 23° C. of a thermoplastic norbornene resin of the present invention is typically from 0.05 to 1% by weight, preferably from 0.1 to 0.7% by weight, and even more preferably from 0.1 to 0.5% by weight. Provided the saturated water absorption falls within the above range, the various optical characteristics such as the transparency, the retardation, the uniformity of the retardation, and the accuracy of the dimensions can be maintained even under conditions of high temperature and humidity, and because the resin offers excellent adhesion and bonding to other materials, separation and peeling during use does not occur. Furthermore, because the resin displays good compatibility with additives such as antioxidants, a greater degree of freedom is achievable relative to additives. If the saturated water absorption is less than 0.05% by weight, then the adhesion and bonding to other materials deteriorates, and separation and peeling during use becomes more likely. Furthermore, there are also restrictions on the inclusion of additives such as antioxidants. In contrast, if the saturated water absorption exceeds 1% by weight, then absorption of water is more likely to produce variations in optical characteristics or variations in dimensions. The aforementioned saturated water absorption values are measured in accordance with ASTM D570, and are determined by immersing the sample for 1 week in 23° C. water, and measuring the increase in weight.

The SP value (solubility parameter) of a thermoplastic norbornene resin of the present invention should preferably be from 10 to 30 ($MPa^{1/2}$), with values from 12 to 25 ($MNa^{1/2}$) being even more preferable, and values from 15 to 20 ($Mpa^{1/2}$) being the most preferred. By ensuring the SP value falls within the above range, not only can the thermoplastic norbornene resin be readily dissolved in normal general purpose solvents, but a stable film production can also be achieved, the characteristics of the product film become more uniform, a product with good adhesion and bonding to other materials can be ensured, and the water absorption can also be controlled at a suitable level.

The glass transition temperature (Tg) of a thermoplastic norbornene resin of the present invention can be altered by factors such as the type of the structural unit a and/or the structural unit b of the norbornene resin, the ratio of the structural unit a to the structural unit b, and the addition of additives, although typically glass transition temperature values are from 80 to 350° C., with temperatures from 100 to 250° C. being preferred, and temperature from 120 to 200° C. being more preferred. In the case of a Tg value of less than 80° C., the temperature at which thermal deformation occurs falls, and there is a danger of heat resistance problems arising, and furthermore, the variation in optical characteristics of the product optical film due to temperature changes also increases. In contrast, if the Tg value exceeds 350° C., then in the case of stretching and orientation processing and the like, when the temperature is raised to a value close to the Tg value, there is an increased chance of the resin undergoing thermal deterioration.

<Additives>

In a thermoplastic norbornene resin of the present invention, other known thermoplastic resins, thermoplastic elastomers, rubber polymers, fine organic particles or fine inorganic particles may also be added, provided they do not lower the transparency or the heat resistance of the norbornene resin.

Other additives such as antioxidants may also be added to thermoplastic norbornene resins of the present invention, and examples of suitable additives such as antioxidants include the compounds listed below.

•Antioxidants 2,6-di-t-butyl-4-methylphenol, 2,2'-dioxy-3,3'-di-t-butyl-5,5'-dimethyldiphenylmethane, tetrakis[methylene-3-(3,5-di-t-butyl-4-hydroxyphenyl)propionate]methane, 1,1,3-tris (2-methyl-4-hydroxy-5-t-butylphenyl)butane, 1,3,5-trimethyl-2,4,6-tris(3,5-di-t-butyl-4-hydroxybenzyl) benzene, stearyl-β-(3,5-di-t-butyl-4-hydroxyphenyl) propionate, 2,2'-dioxy-3,3'-di-t-butyl-5,5'-diethylphenylmethane, 3,9-bis[1,1-dimethyl-2-(β-(3-t-butyl-4-hydroxy-5-methylphenyl)propionyloxy)ethyl], 2,4,8,10-tetraoxaspiro[5.5]undecane, tris(2,4-di-t-butylphenyl) phosphite, and 2,2-methylenebis(4,6-di-t-butylphenyl) octylphosphite

•Ultraviolet Absorbing Agents 2,4-dihydroxybenzophenone and 2-hydroxy4-methoxybenzophenone The amount of these antioxidants and the like added should typically be within a range from 0.01 to 3 parts by weight, and preferably from 0.05 to 2 parts by weight, per 100 parts by weight of the thermoplastic norbornene resin.

Additives such as lubricants may also be added to improve the workability of the resin.

<Film Production Method>

An optical film of the present invention, particularly a single resin-layer film, can be produced by forming a resin of the present invention into a film or a sheet using a method such as a molten molding method or a solution stretching method (a solvent casting method). Of these methods, solvent casting methods are preferred due to the superior uniformity of the film thickness and the smoothness of the product surface.

An optical film comprising two or more resin-layers can be produced by laminating two or more single resin-layer films as described below.

An example of a solvent casting method involves dissolving or dispersing a resin of the present invention in a solvent to produce a liquid of a suitable concentration, pouring or applying this liquid on to a suitable carrier, drying the liquid, and then peeling the product away from the carrier.

When a thermoplastic norbornene resin is dissolved or dispersed within a solvent, the concentration of the resin is typically set to a value from 0.1 to 90% by weight, and preferably 1 to 50% by weight, and even more preferably from 10 to 35% by weight. If the concentration of the resin is less than the above range, then various problems arise such as difficulty in maintaining the film thickness, and difficulty in achieving the desired film surface smoothness due to foaming during the solvent evaporation. In contrast, if the concentration exceeds the above range, then the solution viscosity becomes overly large, and it becomes difficult to produce an optical film with uniform thickness and a uniform surface.

The viscosity of the aforementioned solution at room temperature should typically be within a range from 1 to 1,000,000 (mPa·s), and preferably from 10 to 100,000 (mPa·s), and even more preferably from 100 to 50,000 (mPa·s), with viscosity values from 1,000 to 40,000 (mPa·s) being the most desirable.

Examples of suitable solvents include aromatic solvents such as benzene, toluene and xylene, cellosolve based solvents such as methyl cellosolve, ethyl cellosolve and 1-methoxy-2-propanol, ketone based solvents such as diacetone alcohol, acetone, cyclohexanone, methyl ethyl ketone, 4-methyl-2-pentanone, cyclohexanone, and ethylcyclohexanone, olefine-based solvents such as 1,2-dimethylcyclohexene, and 1,2-diethylcyclohexene, ester based solvents such as methyl lactate and ethyl lactate, halogen containing solvents such as 2,2,3,3-tetrafluoro-1-propanol, methylene chloride and chloroform, ether based solvents such as tetrahydrofuran and dioxane, and alcohol based solvents such as 1-pentanol and 1-butanol.

Solvents other than those listed above may also be used, and provided a solvent is used with a SP value (solubility parameter) which is typically within a range from 10 to 30 ($MPa^{1/2}$), and preferably from 10 to 25 ($MPa^{1/2}$), and even more preferably from 15 to 25 ($MPa^{1/2}$), and most preferably from 15 to 20 ($MPa^{1/2}$), then an optical film with superior surface uniformity and optical characteristics can be produced.

The above solvent may utilize either a single solvent, or a combination of two or more different solvents. In those cases in which two or more different solvents are combined, the SP value of the combined solvent should preferably fall within the SP value ranges specified above. The SP value of a mixed solvent can be determined from the relative weight ratios of each of the component solvents, and for example in the case of a two solvent mixture in which the weight proportions of the two solvents are labeled W1 and W2, and the corresponding solvent SP values are labeled SP1 and SP2 respectively, then the SP value of the mixed solvent can be determined from the formula shown below.

$$SP \text{ value} = W1 \times SP1 + W2 \times SP2$$

In those cases in which an aforementioned solvent mixture is used, by combining a good solvent and a poor solvent of the resin of the present invention, an optical film with a light diffusing function can be obtained. Specifically, if the SP values of the resin, the good solvent and the poor solvent are labeled [SP: resin], [SP: good solvent] and [SP: poor solvent] respectively, then by ensuring that the difference between the [SP: resin] value and the [SP: good solvent] is preferably no more than 7, and more preferably no more than 5, and even more preferably no more than 3, that the difference between the [SP: resin] value and the [SP: poor solvent] is preferably at least 7, and more preferably at least 8, and even more preferably 9 or greater, and that the difference between the [SP: good solvent] value and the [SP: poor solvent] value is preferably at least 3, and more preferably at least 5, and even more preferably 7 or greater, then a light diffusing function can be imparted to the produced optical film.

The proportion of the poor solvent within the solvent mixture is preferably no more than 50% by weight, and more preferably no more than 30% by weight, and even more preferably no more than 15% by weight, and most preferably no more than 10% by weight. The difference in the boiling points of the poor solvent and the good solvent is preferably at least 1° C., and more preferably at least 5° C., and even more preferably at least 10° C., and most preferably at least 20° C., and a poor solvent boiling point which is higher than the good solvent boiling point is preferred.

The temperature at which the thermoplastic norbornene resin is dissolved in the solvent may be either room temperature or a higher temperature. By stirring the mixture adequately, a uniform solution can be achieved. In those cases where coloring is required, a suitable quantity of a coloring agent such as a dye or a pigment may be added to the solution.

A leveling agent may also be added to improve the surface smoothness of the product optical film. Any of the typical leveling agents may be used, and specific examples include fluorine based nonionic surfactants, special acrylic resin based leveling agents, and silicone based leveling agents.

A typical example of a method of producing an optical film of the present invention by a solvent casting method involves using a die or a coater to apply the aforementioned solution to a substrate such as a metal drum, a steel belt, a polyester film such as polyethylene terephthalate (PET) or polyethylene naphthalate (PEN), or a polytetrafluoroethylene belt, subsequently removing the solvent by drying, and then peeling the film away from the substrate. The optical film can also be produced by applying the resin solution to the substrate using spraying, brushing, roll spin coating or dipping techniques, subsequently removing the solvent by drying, and then peeling the film away from the substrate. The thickness and the surface smoothness of the optical film can also be controlled by repeating the application process.

In those cases in which a polyester film is used as the substrate, a surface treated film may be used. Examples of surface treatment methods include the common hydrophilic treatment methods in which, for example, either an acrylic based resin or a sulfonate group containing resin is coated or laminated onto the film, or alternatively the hydrophilicity of the film surface is increased through corona discharge treatment.

If the substrate to which the aforementioned solution is applied utilizes a metal drum, a steel belt or a polyester film or the like which has undergone surface treatment such as sand mat treatment or embossing, then the undulations caused by this surface treatment are transferred to the film surface, enabling the production of an optical film with a light diffusing function.

In cases in which a light diffusing function is imparted to the optical film in this manner, then in terms of maintaining a stable light transmittance for low wavelength light through to high wavelength light, it is preferable that the aforementioned undulations are formed of uniform size. There are no particular restrictions on the form of the undulations, which will vary considerably depending on the technique used for forming the undulations, although typical surface roughness values (center line average height: Ra) are from 0.001 to 100 μm, and preferably from 0.005 to 10 μm, and even more preferably from 0.01 to 1 μm, and most preferably from 0.05 to 1 μm. If the Ra value is less than 0.001 μm or greater than 100 μm, then a good light diffusing function is difficult to achieve. However, in cases in which a lens function such as a Fresnel lens function is imparted to the optical film, the Ra value may sometimes exceed 100 μm.

An optical film with a light diffusing function of the present invention can also be produced by casting a uniform mixture produced by adding, to a solution of a resin of the present invention, another resin or a filler which is incompatible with the resin of the present invention.

Specifically, in those cases in which an aforementioned incompatible resin is added, then the resin should be selected so that the difference between the indexes of refraction of the incompatible resin and the resin of the present invention is typically at least 0.00001, and preferably at least 0.0001, and even more preferably at least 0.001, and most preferably at least 0.01. In a film produced by adding this type of incompatible resin to the solvent, and subsequently mixing, casting and drying, by ensuring that the number average particle diameter of resin areas containing none of the aforementioned incompatible resin is typically within a range from 0.01 to 1000 μm, and preferably from 0.05 to 500 μm, and even more preferably from 0.1 to 100 μm, and most preferably from 0.5 to 50 μm, a light diffusing effect can be produced for light from low wavelengths through to high wavelengths. If the aforementioned difference in the indexes of refraction is less than 0.0001 or the aforementioned particle diameter is less than 0.01 μm, then imparting a satisfactory light diffusing function becomes difficult, whereas if the aforementioned particle diameter exceeds 1000 μm, then the transmittance of light falls markedly, and the precision of the film thickness and the surface are likely to deteriorate.

The amount of the above incompatible resin added can be varied in accordance with the light diffusion performance required, although typical quantities are from 0.001 to 100 parts by weight, and preferably 0.01 to 70 parts by weight, and even more preferably from 0.1 to 50 parts by weight, and most preferably from 1 to 25 parts by weight, per 100 parts by weight of the resin of the present invention. If the added quantity is less than 0.001 parts by weight, then achieving a satisfactory light diffusing function becomes difficult. In contrast, if the added quantity exceeds 100 parts by weight, then the light transmittance falls to an unfavorably low level.

Examples of suitable fillers which may be used include commercially available inorganic fillers, and organic fillers produced by finely crushing a cured thermosetting resin. The particle diameter of the filler and the amount of filler added are similar to the case of the aforementioned incompatible resin.

Specific examples of the incompatible resin for a resin of the present invention include polymethylmethacrylate (PMMA), polystyrene, polyvinylbenzene, polyamide and polyimide. Specific examples of the aforementioned filler include metals such as gold or silver, metal oxides such as $SiO_2$, $TiO_2$, $ZnO_2$ and $Al_2O_3$, and particles of glass and quartz.

There are no particular restrictions on the drying (solvent removal) step in the aforementioned solvent casting method, and most common methods can be used, including passing the material through a drying oven using a plurality of rollers, although if foaming accompanies the evaporation of the solvent during the drying process, then the characteristics of the film deteriorate markedly, and so in order to prevent such foaming, it is preferable that the drying process is divided into a plurality of steps, with the temperature or the air quantity controlled at each step.

The contained or residual solvent content within a resin-layer constituting the optical film of the invention should typically be no more than 10% by weight, and preferably no more than 5% by weight, and even more preferably no more than 1% by weight, and most preferably no more than 0.5% by weight. If the residual solvent content exceeds 10% by weight, then during use, the variations in dimensions of the optical film over time will be undesirably large. The presence of residual solvent also causes a reduction in Tg, and a reduction in heat resistance, both of which are undesirable.

In order to ensure that the stretching and orientation step described below is performed satisfactorily, there are cases where the amount of the residual solvent must be adjusted within the aforementioned range. Specifically, in order to ensure a stable and uniform retardation after stretching and orientation, the residual solvent content should typically be from 10 to 0.1% by weight, and preferably from 5 to 0.1% by weight, and even more preferably from 1 to 0.1% by weight. By limiting the residual solvent content, either the stretching process becomes easier, or control of the retardation becomes simpler.

The thickness of an optical film of the present invention is typically from 0.1 to 3000 μm, and preferably from 0.1 to 1000 μm, and even more preferably from 1 to 500 μm, and most preferably from 5 to 300 μm. At a thickness of less than 0.1 μm, actual handling of the film becomes difficult, whereas in contrast, at a thickness exceeding 3000 μm, winding the film into a roll becomes difficult.

The thickness distribution of an optical film of the present invention is typically within ±20% of the average thickness value, and preferably within ±10%, and even more preferably within ±5%, and most preferably within ±3%. The variation in thickness of the film across 1 cm is typically no more than 10%, and preferably no more than 5%, and even more preferably no more than 1%, and most preferably no more than 0.5%. By controlling the thickness in this manner, irregularity in the retardation after stretching and orientation can be prevented.

—Second Aspect of the Invention—

<Optical Film for Imparting Retardation to Transmitted Light>

This aspect of the present invention provides an optical film for imparting a retardation to transmitted light (hereafter referred to as a retardation film). In this type of retardation film, because the thermoplastic norbornene resin polymer chains which make up the film are oriented in a uniform direction, a retardation can be imparted to transmitted light. This retardation film can be obtained by conducting a stretching process on an optical film, particularly the single resin-layer film, of the first aspect of the present invention in order to orient the polymer chains in a regular manner. What is described here as a regular orientation refers to a retardation film in which overall, the molecular chains are oriented in a regular pattern, either in one axial direction within the plane of the film, or in both axial directions, or even in the direction through the thickness of the film, which contrasts with the more typical situation in which a film of a typical polymer formed by either a molten extrusion method or a solvent casting method, described below, comprises molecular chains which are aligned in no one specific direction, but rather exist in a random arrangement, although this arrangement will vary depending on the size of distortions generated within the film during the formation process. The regularity of the orientation within such an oriented film will vary.

Examples of stretching process methods for producing a retardation film of the present invention include known uniaxial stretching methods and biaxial stretching methods.

In other words, suitable methods include transverse uniaxial stretching techniques using a tenter method, roll compression stretching techniques and longitudinal uniaxial stretching techniques using two sets of rollers of different circumference, as well as biaxial stretching techniques combining a transverse axial stretch and a longitudinal axial stretch, and stretching techniques using inflation methods.

In the case of a uniaxial stretching method, the stretching speed should typically be from 1 to 5000%/min, and preferably from 50 to 1000%/min, and even more preferably from 100 to 1000%/min, and most preferably from 100 to 500%/min.

Biaxial stretching includes both the case in which stretching occurs simultaneously in two directions, and the case in which stretching is first performed in one direction, and then subsequently performed in a second direction different from the first. In such cases, there are no particular restrictions on the angle of intersection between the two stretching axes for controlling the shape of the index ellipsoid of the film following stretching, and this angle is determined by the specific product characteristics desired, although typically the angle is within a range from 120 to 60°. The stretching speed may be the same in both directions, or may be different in each direction, although typically the stretching speed in both directions should be from 1 to 5000%/min, and preferably from 50 to 1000%/min, and even more preferably from 100 to 1000%/min, and most preferably from 100 to 500%/min.

There are no particular restrictions on the stretching process temperature, although referenced against the glass transition temperature Tg of the resin of the present invention, the temperature should typically be Tg±30° C., and preferably Tg±15° C., and even more preferably within a range from Tg−5° C. through to Tg+15° C. By maintaining the temperature within this range, irregularities in retardation can be suppressed, and the index ellipsoid can be controlled more easily.

There are no particular restrictions on the stretching magnification, with this figure typically being determined by the specific product characteristics desired, although typical magnification values should be from 1.01 to 10 fold, and preferably from 1.03 to 5 fold, and even more preferably from 1.03 to 3 fold. If the stretching magnification exceeds 10 fold, then controlling the retardation may become difficult.

The stretched film may simply be cooled, as is, although the film should preferably be heat set by holding the film in an atmosphere at a temperature between Tg-20° C. and Tg for at least 10 seconds, and preferably for 30 to 60 seconds, and even more preferably for 1 to 60 minutes. By so doing, variations in the transmitted light retardation over time can be suppressed, enabling a stable retardation film to be produced.

The contraction coefficient, on heating, of the dimensions of an optical film of the present invention which has not been subjected to stretching, in the case of heating for 500 hours at 100° C., is typically no more than 5%, and preferably no more than 3%, and even more preferably no more than 1%, and most preferably no more than 0.5%.

The contraction coefficient, on heating, of the dimensions of a retardation film of the present invention, in the case of heating for 500 hours at 100° C., is typically no more than 10%, and preferably no more than 5%, and even more preferably no more than 3%, and most preferably no more than 1%.

A contraction coefficient within the above range can be achieved by appropriate selection of the raw materials for a resin of the present invention, namely the monomer A and the monomer B., and suitable control of the casting method or stretching method.

In a stretched film produced in the manner described above, the molecules are aligned as a result of the stretching, and a retardation is imparted to transmitted light, although this retardation can be controlled by factors such as the stretching magnification, the stretching temperature and the thickness of the film. For example, for films of the same thickness prior to stretching, those films with larger stretching magnification display a tendency to produce larger absolute values for the retardation of transmitted light, and consequently by varying the stretching magnification, a retardation film can be produced which imparts a desired level of retardation to the transmitted light. In contrast, for films subjected to the same stretching magnification, those films which displayed a greater thickness prior to stretching have a tendency to produce larger absolute values for the retardation of transmitted light, and consequently by varying the film thickness prior to stretching, a retardation film can be produced which imparts a desired level of retardation to the transmitted light. Within the stretching process temperature range described above, lower stretching temperature values have a tendency to produce larger absolute values for the retardation of transmitted light, and consequently by varying the stretching temperature, a retardation film can be produced which imparts a desired level of retardation to the transmitted light.

The value of the retardation imparted to transmitted light by a stretched retardation film produced in the aforementioned manner can be determined in line with the intended use of the film, and as such there are no particular restrictions, although in those cases in which the film is used within a liquid crystal display element, an electroluminescence display element or a wave plate of a laser optics system, the retardation value is typically from 1 to 10,000 nm, and preferably from 10 to 2000 nm, and even more preferably from 15 to 1000 nm.

The retardation of light which has passed through a retardation film should preferably display a high level of uniformity, and at a wavelength of 550 nm, the variation in the retardation from the average value should typically be no more than ±20%, and preferably no more than ±10%, and even more preferably no more than ±5%. If the variation in the retardation exceeds ±20%, then use of the film within a liquid crystal display element or the like would result in color irregularities and the like, producing a deterioration in the overall -performance of the display.

A retardation film of the present invention comprising a single resin-layer or comprising at least two resin-layers prepared by laminating two or more single resin-layer film together can be used as is, or such films could be bonded to a transparent substrate to form a retardation plate. This retardation plate could also be laminated to other films, sheets or substrates. In cases in which lamination is used, adhesives can be used. Highly transparent adhesives are preferred, and specific examples include pressure sensitive adhesives such as natural rubber, synthetic rubber, vinyl acetate/vinyl chloride copolymers, polyvinyl ether, acrylic based resins and modified polyolefin based resins, curable pressure sensitive adhesives such as the aforementioned resins with a functional group such as a hydroxy group or an amino group to which a curing agent such as an isocyanate group containing compound is added, dry lamination polyurethane based adhesives, synthetic rubber based adhesives and epoxy based adhesives.

In order to improve the efficiency of laminating on another sheet or a substrate, the aforementioned retardation film and the retardation plate can also be laminated, in advance, with an adhesive layer. In such cases, any of the adhesives described above can be used.

<Optical Film with Transparent Conductive Layer>

In an optical film of the present invention, a transparent conductive layer may be laminated to at least one surface of the optical film. Examples of suitable materials for forming such a transparent conductive layer include metals such as Sn, In, Ti, Pb, Au, Pt and Ag, as well as oxides of these metals, and either a simple metal film is formed on the surface of the substrate, or where necessary, the metal film may be subsequently oxidized. The conventional method comprises the adhesion of an oxide layer, although a film can first be formed from a simple metal or a low level oxide, and this film then converted to a transparent film by oxidation using either thermal oxidation, anodic oxidation or liquid. phase oxidation. These transparent conductive layers may be formed by bonding another sheet or film comprising a transparent conductive layer to an optical film, or may be formed directly onto an optical film of the present invention using plasma polymerization methods, sputtering, vacuum deposition, plating, ion plating, spraying methods or electrolytic deposition. There are no particular restrictions on the thickness of the transparent conductive layer, which can be determined in accordance with the desired characteristics, although typically the thickness should be from 10 to 10,000 Angstroms, and preferably from 50 to 5000 Angstroms.

In those cases in which a transparent conductive layer is formed directly on an optical film of the present invention, an adhesive layer or an anchor coat layer may be provided between the film and the transparent conductive layer where necessary. Examples of suitable adhesives include heat resistant resins such as epoxy resins, polyimides, polybutadiene, phenol resins and polyether ether ketones. The aforementioned anchor coat layers utilize materials incorporating so-called acrylic prepolymers such as epoxy diacrylate, urethane diacrylate and polyester diacrylate, and these layers can be cured using known curing techniques such as UV curing or thermosetting.

An optical film with a transparent conductive layer of the present invention can be formed into a laminated product in combination with a polarizing film as a substrate. There are no particular restrictions on the method used for combining the optical film with a transparent conductive layer of the present invention and the polarizing film, and one suitable method involves laminating the optical film with a transparent conductive layer to at least one surface of a polarizing film produced by laminating a protective film to both sides of a polarizing membrane, via a suitable adhesive applied to the opposite side of the optical film from the transparent conductive layer. Alternatively, the optical film with a transparent conductive layer of the present invention could also be used instead of employing the above polarizing membrane protective films, with the polarizing membrane being bonded directly to the optical film, via a suitable adhesive applied to the opposite side of the optical film from the transparent conductive layer. An optical film of the present invention with no transparent conductive layer may also be used as a protective film for a polarizing film which is a substrate. In such a case, if a retardation film of the present invention is used as the protective film, then the protective film will function as a retardation plate, and consequently there is no need to bond a separate retardation plate to the polarizing film.

Where necessary, a gas barrier material such as polyvinylidine chloride or polyvinyl alcohol may also be laminated to at least one surface of an optical film with a transparent conductive layer according to the present invention, in order to lower the transmittance of oxygen and water vapor. In addition, a hard coat layer may then be laminated on top of the gas barrier layer in order to improve the scratch resistance and heat resistance of the film. Examples of suitable hard coat materials include organic hard coat materials such as organic silicon based resins, melamine resins, epoxy resins and acrylic resins, as well as inorganic hard coat materials such as silicon dioxide. Of these materials, organic silicon based resins and acrylic resins are preferred. The organic silicon based resins include resins with all manner of functional groups, although resins with epoxy groups are preferred.

<Optical Film with Antireflective Layer>

In an optical film of the present invention, an antireflective layer may be laminated to at least one surface of the optical film. An example of a commonly used method of forming the antireflective layer involves forming an antireflective film of either an inorganic system comprising a metal oxide of silicon, titanium, tantalum or zirconium, or an organic system comprising a fluorine containing compound such as a (co)polymer of fluorinated vinylidene, hexafluoropropylene, or tetrafluoroethylene, or a (co)polymer of a fluorine containing (meth)acrylate, at a thickness of 0.01 to 10 μm, using sputtering, vapor deposition, coating or dipping methods. The thickness of the antireflective layer is typically from 0.01 to 50 μm, and preferably from 0.1 to 30 μm, and even more preferably from 0.5 to 20 μm. If the thickness is less than 0.01 μm, then the desired antireflective effect is not achieved, whereas if the thickness exceeds 50 μm, then the likelihood of irregularities in the thickness of the applied film increases, causing a deterioration in the external appearance.

A known hard coat layer or a dirt prevention layer may also be laminated to an optical film with an antireflective layer according to the present invention. An aforementioned transparent conductive layer may also be laminated if required. In addition, the optical film may possess a function for imparting a retardation to transmitted light, or a light diffusing function.

By providing the film with a plurality of functions as described above, an optical film with an antireflective layer according to the present invention can enable a reduction to be made in the number of components of a film, so that for example, when such an optical film is used within a liquid crystal display element, the antireflective film may combine a number of functions including that of a retardation plate, a light diffusing film, a polarizing plate protective film or an electrode substrate (transparent conductive layer).

As follows is a more detailed description of the present invention using a series of working examples. However, the present invention is in no way limited to the examples presented below. In the description below, unless otherwise specified the units "parts" and "%" refer to "parts by weight" and "% by weight" respectively.

First is a description of the measurement methods used for obtaining the various measurement values disclosed below.

[Glass Transition Temperature (Tg)]

Using a differential scanning calorimeter (DSC) manufactured by Seiko Instruments Inc., the glass transition temperature was measured under a nitrogen atmosphere, with a programming rate of 20° C./min.

[Saturated Water Absorption]

Saturated water absorption values were measured in accordance with ASTM D570, and were determined by immersing a sample in 23° C. water for 1 week, and measuring the increase in weight.

[Total Light Transmittance, Haze]

These values were measured using a haze meter, HGM-2DP manufactured by Suga Test Instruments Co., Ltd.

[Transmitted Light Retardation]

The retardation of transmitted light was measured using a KOBRA-21ADH and a KOBRA-CCD, both manufactured by Oji Scientific Instruments Co., Ltd.

SYNTHETIC EXAMPLE 1

225 parts of 8methyl-8-methoxycarbonyltetracyclo[4.4.0.1$^{2,5}$.1$^{7,10}$]-3-dodecene (the monomer A-1), 25 parts of bicyclo[2.2.1]hept-2-ene (the monomer B-1 ), 18 parts of 1-hexene (molecular weight regulating agent) and 750 parts of toluene were combined in a reaction vessel under a nitrogen atmosphere, and the solution was then heated to 60° C. To this solution in the reaction vessel were then added 0.62 parts of a toluene solution of triethyl aluminum (1.5 mol/l) as a polymerization catalyst and 3.7 parts of a toluene solution (with a concentration of 0.05 mol/l) of tungsten hexachloride denatured with t-butanol and methanol (t-butanol:methanol:tungsten=0.35 mol:0.3 mol:1 mol), and the system was subsequently stirred for 3 hours at 80° C. to enable the ring opening copolymerization to proceed, and yielded a solution of a ring opening copolymer. The polymerization conversion rate was 97%, and the intrinsic viscosity ($\eta_{inh}$) of the ring opening copolymer, measured in chloroform at 30° C., was 0.65 dl/g.

4000 parts of the thus obtained ring opening copolymer solution was placed in an autoclave, 0.48 parts of RuHCl(CO)[P(C$_6$H$_5$)$_3$]$_3$ was added to the solution, and the resulting mixture was then stirred for 3 hours with heating, under a hydrogen gas pressure of 100 kg/cm$^2$ and with a reaction temperature of 165° C. to complete the hydrogenation reaction.

The reaction product solution (hydrogenated polymer solution) was cooled, and the excess hydrogen gas was expelled. The reaction solution was then poured into a large quantity of methanol, the precipitate was separated and recovered, and this precipitate was dried to yield a hydrogenated polymer (a specific cyclic polyolefin based resin).

The hydrogenation ratio of the hydrogenated polymer produced in this manner (hereafter referred to as resin (a-1)) was measured using 400 MHz $^1$H-NMR and revealed a ratio of 99.9%. The proportion of the structural unit b arising from copolymerization of the monomer B-1 was also measured using 400 MHz $^1$H-NMR, and produced a result of 10.2%. The proportion of the structural unit b was calculated from the absorption of the protons of the methyl group of the methyl ester of the structural unit a which appears at approximately 3.7 ppm, and the absorption of the protons of the alicyclic structures of the structural unit a and the structural unit b which appear in the range between 0.15 and 3 ppm.

270 MHz $^1$H-NMR was also used to measure the proportion of the structural unit b for 3 separate samples obtained by GPC, with weight average molecular weights Mw of less than 10,000, between 10,000 and 30,000, and exceeding 30,000 respectively, and these results showed a variation from the aforementioned 10.2% of no more than 15%.

Measurement of the glass transition temperature (Tg) of the resin (a-1) using a DSC method revealed a value of 130° C. Measurement of the polystyrene equivalent number average molecular weight (Mn) and the weight average molecular weight (Mw) of the resin (a-1) using GPC methods (solvent:tetrahydrofuran) revealed a number average molecular weight (Mn) of 39,000 and a weight average molecular weight (Mw) of 116,000, giving a molecular weight distribution (Mw/Mn) of 2.97.

Measurement of the saturated water absorption of the resin (a-1) at 23° C. yielded a value of 0.3%, and measurement of the SP value produced a result of 19 (MPa$^{1/2}$).

Measurement of the intrinsic viscosity ($\eta_{inh}$) of the resin (a-1) in chloroform at 30° C. produced a value of 0.67 dl/g.

SYNTHETIC EXAMPLE 2

With the exception of using 200 parts of 8-methyl-8-methoxycarbonyltetracyclo[4.4.0.1$^{2,5}$.1$^{7,10}$]-3-dodecene (the monomer A-1) and 50 parts of bicyclo[2.2.1]hept-2ene (the monomer B-1), reaction was conducted in a similar manner to the synthetic example 1 to yield a hydrogenated polymer (hereafter referred to as resin (b-1)).

Measurement of the hydrogenation ratio and the proportion of the structural unit b derived from the monomer B-1 using 400 MHz $^1$H-NMR produced results of 99.9% and 20.1% respectively. The proportion of the structural unit b was calculated in the same manner as for the synthetic example 1.270 MHz $^1$H-NMR was also used to measure the proportion of the structural unit b for 3 separate samples obtained by GPC, with weight average molecular weights Mw of less than 10,000, between 10,000 and 30,000, and exceeding 30,000 respectively, and these results showed a variation from the aforementioned 20.1% of no more than 15%.

Measurement of the glass transition temperature (Tg) of the resin (b-1) using a DSC method revealed a value of 110° C. Measurement of the polystyrene equivalent number average molecular weight (Mn) and the weight average molecular weight (Mw) of the resin (b-1) using GPC methods (solvent:tetrahydrofuran) revealed a number average molecular weight (Mn) of 40,000 and a weight average molecular weight (Mw) of 122,000, giving a molecular weight distribution (Mw/Mn) of 3.05.

Measurement of the saturated water absorption of the resin (b-1) at 23° C. yielded a value of 0.2%, and measurement of the SP value produced a result of 19 (MPa$^{1/2}$).

Measurement of the intrinsic viscosity ($\eta_{inh}$) of the resin (b-1) in chloroform at 30° C. produced a value of 0.68 dl/g.

SYNTHETIC EXAMPLE 3

With the exception of using 210 parts of 8-methyl-8-methoxycarbonyltetracyclo[4.4.0.1$^{2,5}$.1$^{7,10}$]-3-dodecene 5-phenylbicyclo[2.2.1]hept-2-ene (the monomer B-2), reaction was conducted in a similar manner to the synthetic example 1 to yield a hydrogenated polymer (hereafter referred to as resin (c-1)).

Measurement of the hydrogenation ratio and the proportion of the structural unit b derived from the monomer B-2 using 400 MHz $^1$H-NMR produced results of 99.9% and 15.8% respectively. The proportion of the structural unit b was calculated from the absorption of the protons of the aromatic ring of the structural unit b which appears in a range between approximately 6 and 7 ppm, and the absorption of the protons of the alicyclic structures of the structural unit a and the structural unit b which appear in the range between 0.15 and 3 ppm.

270 MHz $^1$H-NMR was also used to measure the proportion of the b constituent for 3 separate samples obtained by GPC, with weight average molecular weights Mw of less than 10,000, between 10,000 and 30,000, and exceeding 30,000 respectively, and these results showed a variation from the aforementioned 15.8% of no more than 15%.

Measurement of the glass transition temperature (Tg) of the resin (c-1) using a DSC method revealed a value of 140° C. Measurement of the polystyrene equivalent number average molecular weight (Mn) and the weight average molecular weight (Mw) of the resin (c-1) using GPC methods (solvent:tetrahydrofuran) revealed a number average molecular weight (Mn) of 41,000 and a weight average molecular weight (Mw) of 138,000, giving a molecular weight distribution (Mw/Mn) of 3.37.

Measurement of the saturated water absorption of the resin (c-1) at 23° C. yielded a value of 0.3%, and measurement of the SP value produced a result of 19 (MPa$^{1/2}$).

Measurement of the intrinsic viscosity ($\eta_{inh}$) of the resin (c-1) in chloroform at 30° C. produced a value of 0.69 dl/g.

COMPARATIVE SYNTHETIC EXAMPLE

With the exception of using 250 parts of 8methyl-8-methoxycarbonyltetracyclo[4.4.0.1$^{2,5}$.1$^{7,10}$]-3-dodecene (the monomer A-1) reaction was conducted in a similar manner to the synthetic example 1 to yield a hydrogenated polymer (hereafter referred to as resin (d-1)).

Measurement of the hydrogenation ratio using 400 MHz $^1$H-NMR produced a result of 99.9%.

Measurement of the glass transition temperature (Tg) of the resin (d-1) using a DSC method revealed a value of 170° C. Measurement of the polystyrene equivalent number average molecular weight (Mn) and the weight average molecular weight (Mw) of the resin (d-1) using GPC methods (solvent:tetrahydrofuran) revealed a number average molecular weight (Mn) of 38,000 and a weight average molecular weight (Mw) of 122,000, giving a molecular weight distribution (Mw/Mn) of 3.21.

Measurement of the saturated water absorption of the resin (d-1) at 23° C. yielded a value of 0.4%, and measurement of the SP value produced a result of 19 (MPa$^{1/2}$).

Measurement of the intrinsic viscosity ($\eta_{inh}$) of the resin (d-1) in chloroform at 30° C. produced a value of 0.67 dl/g.

EXAMPLE 1

The aforementioned resin (a-1) was dissolved in toluene to produce a concentration of 30% (the viscosity of the solution at room temperature was 30,000 mPa·s), and an INVEX lab coater manufactured by Inoue Kinzoku Kogyo Co., Ltd. was then used to apply the solution to a PET film (Lumirror U94 manufactured by Toray Industries Co., Ltd.) of thickness 100 µm which had been subjected to hydrophilic surface treatment with an acrylic acid based system (to improve the adhesion), in sufficient quantity to produce a film, on drying, with a thickness of 100 µm. The film was then subjected to preliminary drying at 50° C., and then secondary drying at 90° C. The resin film was then peeled away from the PET film to yield a resin film (a-2). The residual solvent content of the thus obtained film was 0.5%. Using a similar method, a resin film (a-3) with a film thickness of 50 µm and a residual solvent content of 0.4% was also produced. The total light transmittance for these films was 93% or greater.

Measurement of the tear strength of the film (a-2) and the film (a-3) in accordance with the method prescribed in JIS K7128B revealed good strength (toughness) values of 0.368 (N) and 0.215 (N) respectively.

The film (a-2) was heated to a temperature of Tg+5° C., namely 135° C., in a tenter, and then stretched 1.3 fold at a stretching speed of 400%/min. The stretched film was then held for approximately two minutes while being cooled in a 110° C. atmosphere, and was then further cooled to room temperature, before being removed to yield a retardation film (a-4) which at a wavelength of 550 nm imparted a retardation of 135 nm to transmitted light. Another film was produced in a similar manner to that described above but with a stretching magnification of 1.7 fold, and yielded a retardation film (a-5) which at a wavelength of 550 nm imparted a retardation of 270 nm to transmitted light.

A graph showing the retardation value Re of transmitted light within a wavelength range from 400 to 800 nm for these retardation films (a-4) and (a-5), normalized against the retardation value Re (550) of transmitted light at a wavelength 550 nm, is shown in FIG. 1.

EXAMPLE 2

Using the same methods as those described in the example 1, the aforementioned resin (b-1) was used to produce a resin film (b-2) of thickness 100 µm with a residual solvent content of 0.4%, and a resin film (b-3) of thickness 50 µm with a residual solvent content of 0.3%. The total light transmittance for these films was 93% or greater.

Measurement of the tear strength of the film (b-2) and the film (b-3) using the method described above revealed good strength (toughness) values of 0.512 (N) and 0.317 (N) respectively.

EXAMPLE 3

Using the same methods as those described in the example 1, the aforementioned resin (c-1) was used to produce a resin film (c-2) of thickness 100 µm with a residual solvent content of 0.4%, and a resin film (c-3) of thickness 50 µm with a residual solvent content of 0.3%. The total light transmittance for these films was 93% or greater.

Measurement of the tear strength of the film (c-2) and the film (c-3) using the method described above revealed good strength (toughness) values of 0.426 (N) and 0.262 (N) respectively.

COMPARATIVE EXAMPLE

Using the same methods as those described in the example 1, the aforementioned resin (d-1) was used to produce a resin film (d-2) of thickness 100 µm with a residual solvent content of 0.4%, and a resin film (d-3) of thickness 50 µm with a residual solvent content of 0.3%. The total light transmittance for these films was 93% or greater.

Measurement of the tear strength of the film (d-2) and the film (d-3) using the method described above revealed poor strength (toughness) values of 0.138 (N) and 0.052 (N) respectively.

Using this film (d-3), an attempt was made to stretch the film at a temperature of Tg+5° C., namely 175° C., in a similar manner to the example 1, but the film broke during the stretching, and so a stretched and oriented film was not able to be produced.

The measured tear strength results for the above examples and the comparative example have been summarized in Table 1 below.

TABLE 1

| | Film | Thickness (µm) | Tear strength (N) |
|---|---|---|---|
| Example 1 | (a-2) | 100 | 0.368 |
| | (a-3) | 50 | 0.215 |
| Example 2 | (b-2) | 100 | 0.512 |
| | (b-3) | 50 | 0.317 |
| Example 3 | (c-2) | 100 | 0.426 |
| | (c-3) | 50 | 0.262 |
| Comparative example | (d-2) | 100 | 0.138 |
| | (d-3) | 50 | 0.052 |

EXAMPLE 4

The resin films (a-4) and (a-5) produced in the example 1 were laminated together so that the angle of intersection between the two optical axes (the planar direction at which the index of refraction is largest) was 62°, to produce an optical film (retardation plate). The wavelength dependency of the retardation of transmitted light was then measured for this retardation plate. In other words, the value of Re($\lambda$)/$\lambda$ (wherein, Re($\lambda$) is the retardation value for transmitted light of a wavelength $\lambda$) within a wavelength range from 400 to 800 nm was measured for the retardation plate, and these results were plotted in FIG. 2. In the figure, Re($\lambda$) has been abbreviated to Re.

Figure 2:
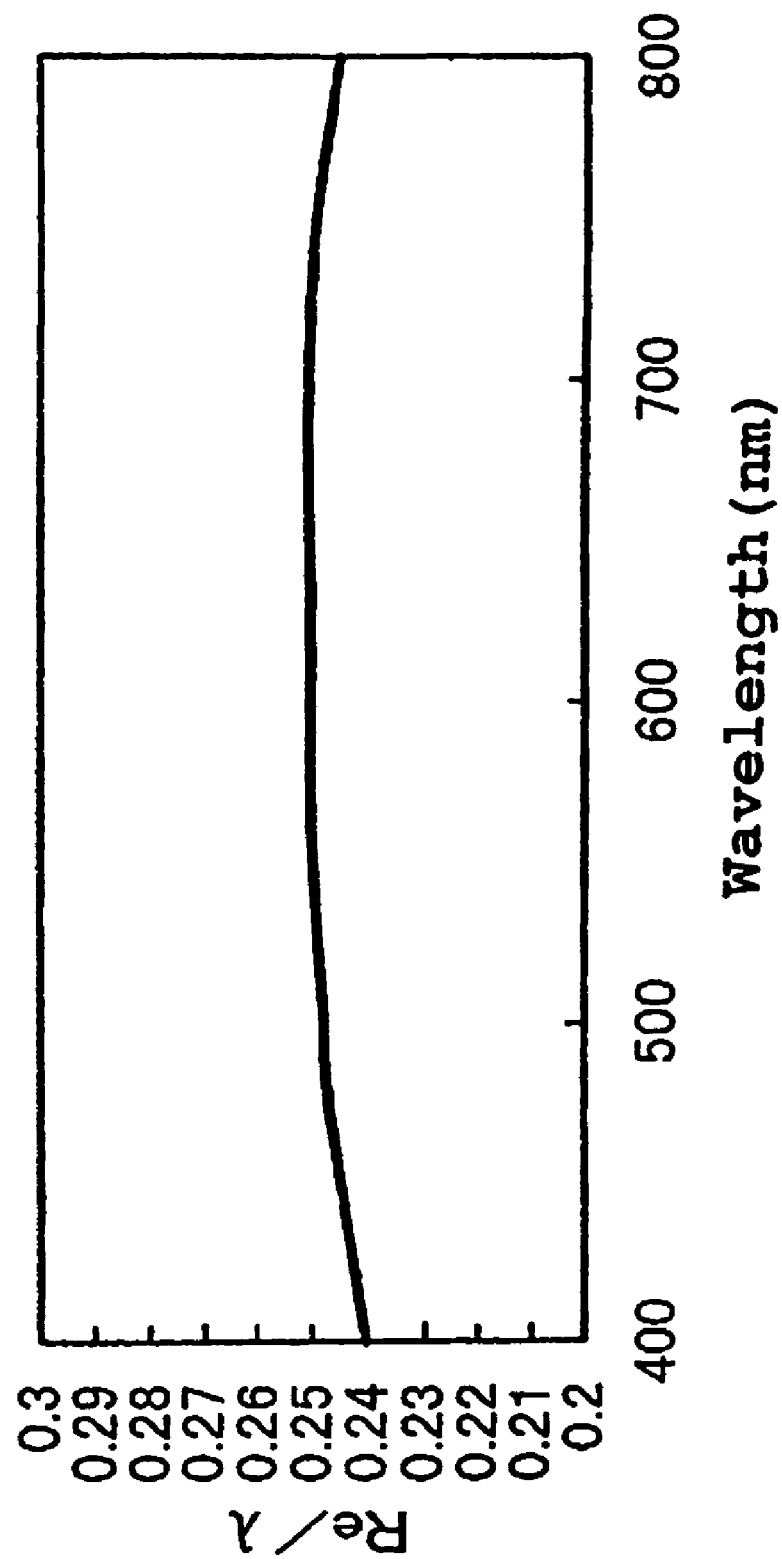
FIG. 2 is a graph showing the wavelength dependency of the retardation applied to transmitted light by a retardation plate obtained by laminating and bonding the retardation films (a-4) and (a-5) produced in the example 1, in other words, the results of measuring the relationship Re(λ)/λ between the wavelength λ of transmitted light within a wavelength range from 400 to 800 nm, and the retardation value Re(λ) of transmitted light of wavelength λ (the term Re(λ) is abbreviated to Re in the figure).

As is evident from FIG. 2, the value of Re/$\lambda$ for wavelengths between 400 and 800 nm was 0.248 (the average value of measurement results taken at 50 nm intervals within the wavelength range from 400 to 800 nm were used) ±0.02, and the variation in results was within ±20%.

EXAMPLE 5

The resin films (a-2) and (a-4) produced in the example 1 were each subjected to sand mat treatment, to produce films, (a-6) and (a-7) respectively, with a light diffusing function and with haze values of 55% and total light transmittance values of 93%.

EXAMPLE 6

A transparent conductive membrane was formed on one surface of each of the resin films (a-2) and (a-4) produced in the example 1, using sputtering techniques with a target of indium oxide/tin oxide (weight ratio of 95:5), to yield transparent conductive films (a-8) and (a-9) respectively. These transparent conductive films were then visually inspected for transparency and external appearance (the presence or absence of scratches, and the degree of warping of the film). Both transparent conductive films displayed a good level of transparency with total light transmittance exceeding 85%, and the external appearance was also excellent, with no scratches, warping or swelling.

The transparent conductive films (a-8), (a-9) were subjected to a 500 hour durability test under conditions of 80° C. and a relative humidity of 90%, and the external appearance of each film was then visually inspected for evidence of changes (moisture resistance), but no changes from the initial state were visible, indicating excellent durability.

EXAMPLE 7

A film of OPSTAR JN7212 manufactured by JSR Corporation, which is a material of low index of refraction, was applied to one surface of each of the films (a-2) and (a-4) produced in the example 1, in sufficient quantity to produce a dried thin film of thickness 0.1 □m, thereby yielding films (a-10) and (a-11), respectively, with antireflective layers. Both films displayed excellent antireflective characteristics, with a reflectance of no more than 1% in both cases.

EXAMPLE 8

A polarizing film was first prepared by immersing a polyvinyl alcohol film of thickness 50 μm into a 40° C. solution containing 5 g of iodine, 250 g of potassium iodide, 10 g of boron and 1000 g of water, and then uniaxially stretching the film by a factor of 4 fold over a period of approximately 5 minutes. To the surface of this polarizing film was applied an adhesive produced by combining 100 parts of an acrylic based resin formed from a monomer mixture of 90% by weight of n-butyl acrylate, 7% by weight of ethyl acrylate and 3% by weight of acrylic acid, and 2 parts of a cross linking agent formed from a 75% by weight ethyl acetate solution of a trimethylolpropane (1 mol) addition product of tolylenediisocyanate (3 mols), and the film (a-2) produced in the example 1 was subsequently laminated to both sides of the polarizing film to produce a polarizing film (a-12). The polarizing film (a-12) was subjected to a 500 hour durability test under conditions of 80° C. and a relative humidity of 90%, and the external appearance of the film was visually inspected for evidence of changes, but no abnormalities could be detected in the external appearance, and the degree of polarization was also unchanged from the original value (99.9%), indicating excellent durability.

EXAMPLE 9

With the exception of replacing the toluene (solvent) used in the example 1 with a mixed solvent containing methylene chloride (good solvent) with a boiling point of 40° C. and an SP value of 19.2 ($MPa^{1/2}$) and methanol (poor solvent) with a boiling point of 65° C. and an SP value of 29.7 ($MPa^{1/2}$) in a ratio such that the methanol proportion within the mixed solvent was 10% by weight, a film was prepared in the same manner as the example 1, yielding a film (a-13) with a light diffusing function, with a haze value of 40% and a total light transmittance of 93%.

EXAMPLE 10

With the exception of adding 10 parts of PMMA particles (with an average particle diameter of 20 μm as measured by TEM) with an index of refraction at room temperature of 1.492 (d line) per every 100 parts of the resin (a-1) with an index of refraction at room temperature of 1.515 (d line), a resin film was prepared in the same manner as the example 1, and yielded a film (a-14) with a light diffusing function, with a haze value of 30% and a total light transmittance of 92%.

EXAMPLE 11

With the exception of replacing the PET film used in the example 1 with a mat treated PET film with an irregular surface, a film was prepared in the same manner as the example 1, yielding a film (a-15) with a light diffusing function, with a haze value of 10% and a total light transmittance of 93%.

INDUSTRIAL APPLICABILITY

An optical film of the present invention displays all of the advantages associated with conventional thermoplastic norbornene resin based films including superior optical characteristics such as a high degree of transparency, a low retardation, and a uniform and stable application of retardation to transmitted light upon stretching and orientation, together with good levels of heat resistance and adhesion and bonding with other materials, and little deformation on water absorption, and in addition also possesses a high degree of toughness which has not been obtainable with conventional thermoplastic norbornene resin systems. Moreover, during production of an optical film of the present invention, the retardation of transmitted light and the wavelength dependency of that retardation can also be controlled. Consequently, this type of optical film can be used as a retardation film, and as an optical film with a light diffusing function, transparent conductivity, or an antireflective function, and potential applications include liquid crystal display elements in a wide variety of devices such as mobile telephones, personal digital assistants, pocket pagers, navigation systems, vehicle mounted liquid crystal displays, liquid crystal monitors, light modulation panels, OA (office automation) equipment displays and AV (audiovisual) equipment displays, as well as electroluminescence displays or touch panels. This type of optical film can also be used as the wave plate within recording and/or playback devices for optical disks such as CD, CD-R, MD, MO (mannetooptic) and DVD disks.

The invention claimed is:

1. An optical film comprising at least one resin-layer comprising a thermoplastic norbornene resin formed of a copolymer comprising:

a structural unit a represented by formula (1) below:

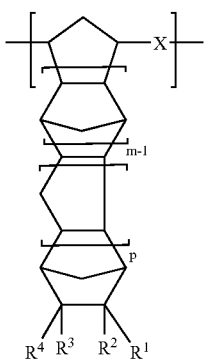

(1)

wherein, m is 1, p is 0, and the definitions of X and $R^1$ to $R^4$ are consistent with the specifically named monomers A as follows:

8-methoxycarbonyltetracyclo[4.4.0.1$^{2,5}$.1$^{7,10}$]-3-dodecene,
8-ethoxycarbonyltetracyclo[4.4.0.1$^{2,5}$.1$^{7,10}$]-3-dodecene,
8-n-propoxycarbonyltetracyclo[4.4.0.1$^{2,5}$.1$^{7,10}$]-3-dodecene,
8-isopropoxycarbonyltetracyclo[4.4.0.1$^{2,5}$.1$^{7,10}$]-3-dodecene,
8-n-butoxycarbonyltetracyclo[4.4.0.1$^{2,5}$.1$^{7,10}$]-3-dodecene,
8-phenoxycarbonyltetracyclo[4.4.0.1$^{2,5}$.1$^{7,10}$]-3-dodecene,
8-methyl-8-methoxycarbonyltetracyclo[4.4.0.1$^{2,5}$.1$^{7,10}$]-3-dodecene,
8-methyl-8-ethoxycarbonyltetracyclo[4.4.0.1$^{2,5}$.1$^{7,10}$]-3-dodecene,
8-methyl-8-n-propoxycarbonyltetracyclo[4.4.0.1$^{2,5}$.1$^{7,10}$]-3-dodecene,
8-methyl-8-isopropoxycarbonyltetracyclo[4.4.0.1$^{2,5}$.1$^{7,10}$]-3-dodecene,
8-methyl-8-n-butoxycarbonyltetracyclo[4.4.0.1$^{2,5}$.1$^{7,10}$]-3-dodecene, and
8-methyl-8-phenoxycarbonyltetracyclo[4.4.0.1$^{2,5}$.1$^{7,10}$]-3-dodecene; and a structural unit b represented by formula (2) below:

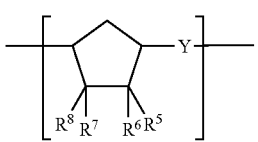

(2)

wherein,
Y represents formula —CH=CH— or formula —CH$_2$CH$_2$—,
$R^5$ to $R^8$ each represent, independently, a hydrogen atom, a halogen atom, a substituted or unsubstituted hydrocarbon group of 1 to 30 carbon atoms which may contain a linkage group incorporating any one of an oxygen atom, a nitrogen atom, a sulfur atom, a silicon atom, or a polar group, provided that said groups $R^5$ to $R^8$ each exclude a group represented by formula (a) below:

—(CH$_2$)$_q$—O—C(O)—R'        (a)

where q represents 0 or an integer of at least 1, and R' represents an organic group, a plurality of X's present in a molecule of said copolymer being the same or different, and a plurality of Y's present in a molecule of said copolymer being the same or different, wherein the weight ratio (a/b) of said structural unit a to said structural unit b in the copolymer is in the range of 95/5 to 60/40.

2. A polarizing plate comprising an optical film according to claim 1.

3. The polarizing plate according to claim 2, wherein said optical film is present as a protective film formed on at least one surface of a substrate of said plate.

4. The polarizing plate according to claim 2, wherein said optical film is present as the substrate of said plate.

5. The optical film according to claim 1, which imparts retardation to transmitted light.

6. The optical film according to claim 5, comprising at least two said resin-layers laminated together, each of the layers imparting retardation to transmitted light, and wherein the value of the ratio: Re(λ)/λ wherein λ represents the wavelength of transmitted light from said film, and Re(λ) represents the retardation at the wavelength λ, varies over the entire wavelength range from 400 to 800 nm within ±20% of the average value.

7. A method for the production of an optical film as defined in claim 1, comprising:
casting an organic solvent solution containing the thermoplastic norbornene resin of claim 1 onto a surface.

8. The method according to claim 7, wherein said organic solvent is a mixed solvent of a good solvent and a poor solvent for said thermoplastic norbornene resin.

9. The optical film according to claim 1, wherein, in said formula (2), said groups $R^5$ to $R^8$ each represent, independently, either a hydrogen atom or a hydrocarbon group of 1 to 30 carbon atoms.

10. The optical film according to claim 1, wherein said copolymer has a glass transition temperature (Tg) of 80 to 350° C.

11. The optical film according to claim 1, wherein a solvent content in the or each resin-layer is no more than 10% by weight.

12. The optical film according to claim 1, which has a light diffusing function on at least one surface thereof.

13. The optical film according to claim 1, which has a transparent conductive layer on at least one surface thereof.

14. The optical film according to claim 1, which has an antireflective layer on at least one surface thereof.

15. The optical film according to claim 1, wherein the monomer B of structural unit b is a compound selected from the group consisting of:
bicyclo[2.2.1]hept-2-ene,
5-methylbicyclo[2.2.1]hept-2-ene,
5-ethylbicyclo[2.2.1]hept-2-ene,
5-methoxycarbonylbicyclo[2.2.1]hept-2-ene,
5-methyl-5-methoxycarbonylbicyclo[2.2.1]hept-2-ene,
5-phenoxycarbonylbicyclo[2.2.1]hept-2-ene,
5-methyl-5-phenoxycarbonylbicyclo[2.2.1]hept-2-ene,
5-cyanobicyclo[2.2.1]hept-2-ene,
5-ethylidenebicyclo[2.2.1]hept-2-ene, 5-phenylbicyclo[2.2.1]hept-2-ene,
α form of 5-(2-naphthyl)bicyclo[2.2.1]hept-2-ene,
β form of 5-(2-naphthyl)bicyclo[2.2.1 ]hept-2-ene,
5-fluorobicyclo[2.2.1]hept-2-ene,
5-fluoromethylbicyclo[2.2.1]hept-2-ene,
5-trifluoromethylbicyclo[2.2.1]hept-2-ene,
5-pentafluoroethylbicyclo[2.2.1]hept-2-ene,
5,5-difluorobicyclo[2.2.1]hept-2-ene,
5,6-difluorobicyclo[2.2.1]hept-2-ene,
5,5-bis(trifluoromethyl)bicyclo[2.2.1]hept-2-ene,
5,6-bis(trifluoromethyl)bicyclo[2.2.1]hept-2-ene,
5-methyl-5-trifluoromethylbicyclo[2.2.1]hept-2-ene,
5,5,6-trifluorobicyclo[2.2.1]hept-2-ene,
5,5,6-tris(trifluoromethyl)bicyclo[2.2.1]hept-2-ene,
5,6,6-tetrafluorobicyclo[2.2.1]hept-2-ene,
5,5,6,6-tetrakis(trifluoromethyl)bicyclo[2.2.1]hept-2-ene,
5,5-difluoro-6,6-bis(trifluoromethyl)bicyclo[2.2.1]hept-2-ene,
5,6-difluoro-5,6-bis(trifluoromethyl)bicyclo[2.2.1]hept-2-ene,
5,5,6-trifluoro-6-trifluoromethylbicyclo[2.2.1]hept-2-ene,
5-fluoro-5-pentafluoroethyl-6,6-bis(trifluoromethyl)bicyclo[2.2.1]hept-2-ene,
5,6-difluoro-5-heptafluoro-iso-propyl-6-trifluoromethylbicyclo[2.2.1]hept-2-ene,
5-chloro-5,6,6-trifluorobicyclo[2.2.1]hept-2-ene,
5,6-dichloro-5,6-bis(trifluoromethyl)bicyclo[2.2.1]hept-2-ene,
5,5,6-trifluoro-6-trifluoromethoxybicyclo[2.2.1]hept-2-ene,
5,5,6-trifluoro-6-heptafluoropropoxybicyclo[2.2.1]hept-2-ene,
5-(4-phenylphenyl)bicyclo[2.2.1]hept-2-ene, and
4-(bicyclo[2.2.1]hept-5-en-2-yl)phenylsulfonylbenzene.

* * * * *